United States Patent [19]
Shepherd

[11] Patent Number: 5,415,572
[45] Date of Patent: May 16, 1995

[54] ADAPTOR FOR ELECTRIC COOKING APPARATUS

[75] Inventor: Martin J. Shepherd, Colby, United Kingdom

[73] Assignee: Strix Limited, United Kingdom

[21] Appl. No.: 187,717

[22] Filed: Jan. 28, 1994

[30] Foreign Application Priority Data

Jan. 29, 1993 [GB] United Kingdom ............. 9301754

[51] Int. Cl.$^6$ ............................................. H05B 1/00
[52] U.S. Cl. ................................ 439/638; 439/928; 439/919; 219/392; 29/854
[58] Field of Search ............... 219/392, 401–403; 439/928, 676, 692, 638–654, 929, 926, 913, 915, 919; 29/854

[56] References Cited

U.S. PATENT DOCUMENTS

| | | | |
|---|---|---|---|
| 2,798,930 | 7/1957 | Frost | 439/928 |
| 3,174,028 | 3/1965 | Ammerman | 439/928 |
| 3,767,897 | 10/1973 | Prucha et al. | 439/928 |
| 3,781,757 | 12/1973 | Barnes | 439/928 |
| 4,740,173 | 4/1988 | Justiano et al. | 439/928 |

*Primary Examiner*—David Pirlot
*Attorney, Agent, or Firm*—Bacon & Thomas

[57] ABSTRACT

An adaptor (4) for adapting a domestic cooking apparatus (1) to supply power to a liquid heating vessel (5) having its own heating element is arranged to be received within a well (3) of the cooking apparatus (1). The heating vessel (5) is supported on the upper surface (12) of the adaptor (4). The adaptor has a first electrical connector (18) which releasably engages with the socket connector (20) in the well wall, which normally receives the heating element (2) of the cooking apparatus. A second electrical connector (22) electrically connected to the first connector means is arranged in the upper surface (12) for detachable engagement with the terminal pins (34,36,38) of the vessel (5).

15 Claims, 3 Drawing Sheets

ADAPTOR FOR ELECTRIC COOKING APPARATUS

BACKGROUND OF THE INVENTION

The present invention relates to electrically powered liquid heating vessels, such as kettles or hot water jugs incorporating heating elements, and in particular to an adaptor which will allow such vessels to be powered from a domestic electric cooking apparatus.

Electrically powered water heating vessels such as kettles and hot water jugs are widely used in countries such as the United Kingdom and Australia, for heating water in quantities of say up to 2 liters, sufficient for making tea, coffee and other hot beverages, in the home. Typically such vessels incorporate an immersion heating element rated at around 2000–2500 W, which allows water to be boiled quickly. This is possible because the mains voltage available from wall sockets, from which such vessels are powered, is nominally 220/240 V and therefore a current of the order of 10 A is typically drawn by the element which is acceptable for such an appliance.

Power may be supplied to the vessel in one of two ways. In the most traditional arrangement an electrical power lead has a plug connector at one end, for engagement with the wall socket, and at the other end a socket connector for direct engagement with terminal pins extending from the vessel, which is free standing. In a more recently introduced and increasingly popular arrangement, the vessel is provided with a separate base unit, upon which it normally rests. An electrical power lead again has a plug connector for engagement with the wall socket, but is fixedly connected at its other end to a socket connector mounted within the base unit with which the terminal pins of the vessel engage automatically when the vessel is placed upon the base unit to supply power to the heating element of the vessel. Thus, when it is desired in the latter type of device to pour liquid from the vessel, it is merely lifted from the base unit, so automatically disconnecting the power from the vessel.

This so called "cordless" arrangement is convenient since it is no longer necessary to unplug the lead from the vessel every time liquid is to be poured from it. An example of such a construction is described in commonly owned U.S. Pat. No. 4,934,955, the disclosure of which is incorporated herein by reference.

These vessels nowadays nearly all have built in switch means which allow them to be manually turned on and off, and which are also openable in response to liquid in the vessel boiling, so as automatically to disable the heater when the liquid boils. A protector switch means is also traditionally provided for disabling the heater in the event of it overheating e.g. after having been switched on with insufficient liquid in the vessel to cover the element.

In the United States, however, domestic wiring regulations are different from those in countries such as the United Kingdom. A transformer placed in the domestic supply provides a 220 V, split phase, supply. Wall sockets are connected across a half phase, which means that they effectively receive only a 110 V supply. Thus while electric kettles are known in the United States, they have to be lower wattage devices, typically 1600 W in order to keep the current within acceptable limits. This means that they take a relatively long time to boil water and for this reason, kettles are not popular in the United States. It is more common to boil water in saucepans on cookers which is both time consuming and inconvenient. There is no immersion heater, and no automatic cut-out switching is available.

In the United States domestic cookers are traditionally hard wired into the power supply across the full 220 V supply, so that cooker heating elements can be run at higher wattages than appliances from standard wall sockets.

Moreover, it is standard in U.S. domestic cookers for the hob heating elements to be removable, so that the wells underneath the elements can easily be cleaned. Thus, typically, a heating element is provided with push fit terminals which engage with a socket, or receptacle, provided in the side wall of the element well.

SUMMARY OF THE INVENTION

It is an object of the invention to provide apparatus which will allow higher wattages to be used in domestic, electrically powered, liquid heating vessels, whereby liquid may be boiled more quickly than heretofore.

It is a further object of the invention to provide an adaptor whereby domestic cooking apparatus may be used to power a portable domestic water heating vessel incorporating its own electric heater.

The invention provides an adaptor which supports a liquid heating vessel, of a type incorporating its own electric heater, on a domestic cooking apparatus. The adaptor is configured to be interchangeable with a detachable hob heating element of a cooking apparatus and is provided with means for supporting the vessel and with a first electrical connector for releasable engagement with a socket connector provided in the cooking apparatus. The socket connector is that which connects with the hob heating element in normal use of the cooking apparatus. This connector is commonly called a receptacle. The adaptor is also provided with a second connector electrically connected with the first connector, for engagement with electrical supply terminals of the liquid heating vessel when the vessel is placed on the adaptor.

Thus in accordance with the invention, a conventional hob heating element may be removed from a cooking apparatus and simply replaced with an adaptor whose general size and shape is similar to a ring like element. When it is desired to boil water, for example, a kettle or hot water jug incorporating its own electric heater and switching means as described above may then be placed on the adaptor, so that its electrical supply terminals are engaged with the second connector in the adaptor. The adaptor may be left in situ for as long as desired. For example, if a cooker user does not use all the hob heating elements of the cooker, it could be left in situ semi-permanently. However, if the need arose to use the removed element again, the adaptor of the invention can easily be removed and the element replaced.

Following the teachings of the invention, a domestic electric kettle or jug can for the first time in the United States be run at a higher wattage e.g. 2000–2500 W without drawing an unacceptably high current. This is a consequence of the higher voltage available from a domestic cooker terminal. The arrangement is far superior to using a saucepan, in view of the greater rapidity to boiling achievable with an immersion heater and provision of switch means to disable the heater upon boiling or if overheating as are traditionally found in such appliances.

The invention also provides a method of converting a domestic electric cooker for use with an electrically powered liquid heating vessel which comprises removing one of the heating elements of the cooker and engaging an adaptor means with an electrical connector means of the cooker previously connected to said removed element, said adaptor means providing an electrical connection between the cooker connector means and a further connector means of the adaptor means, the further connector means being detachably engageable with electrical terminals of the vessel.

Another aspect of the invention provides an electrical cooking apparatus comprising a plurality of heating elements, wherein the improvement comprises a socket connector means which co-operates with a terminal pin connector provided on a liquid heating vessel for the supply of electrical power to a heating element incorporated in such vessel.

In one form of the invention, the second connector of the adaptor is a socket connector, extending upwardly from a support surface of the adaptor. The liquid heating vessel will then be provided with pin terminals which engage with the socket connector when the vessel is placed on the base. The vessel may then be the same as one used in a standard "cordless" arrangement with the adaptor taking the place of the base unit. The terminal pins may extend horizontally, for example, to engage vertically in upwardly open slots provided in the socket connector. An example of such an arrangement is disclosed in commonly owned International Patent Application No. WO92/05604, the disclosure of which is incorporated herein by reference. Alternatively, the terminal pins may extend vertically for engagement with upwardly open apertures in the socket connector. An arrangement of this type is shown in the earlier mentioned U.S. Pat. No. 4,934,955.

To prevent accidental access to the socket connector in the adaptor, pin receiving apertures therein may be suitably shuttered, for example by a spring shutter plate which is pushed out of the way by one or more of the terminal pins as they enter the aperture. Such an arrangement is also described in U.S. Pat. No. 4,934,955.

The adaptor should be made of a material which will be capable of withstanding the temperatures likely to be encountered on the upper surface of a domestic cooking apparatus. Thus, it may be made of, for example, stainless steel or a suitably heat resistant plastics material.

The liquid heating vessel is supported on an upper surface of the adaptor. To prevent water accumulating on the upper surface, an aperture may be provided therein to allow water to drain away from it. The surface may be inclined towards the aperture to encourage water to flow into the aperture.

The upper surface of the adaptor may also have means for assisting in the proper location of the vessel thereon. For example co-operating formations may be provided on the vessel and the adaptor.

In order that it may fill substantially the cooker well, into which it is placed, the adaptor may be generally circular in plan. The adaptor may be provided with feet to support it within the cooker well.

The adaptor is advantageously provided with suitable cowling means arranged over the first connector so as to prevent accidental splashing of water into the connector.

It is anticipated that an adaptor and a liquid heating vessel might initially be supplied together. Once an adaptor is installed, however, should for any reason the liquid heating vessel become unserviceable, it may be replaced, without the need for the adaptor to be replaced.

BRIEF DESCRIPTION OF DRAWINGS

One embodiment of the invention will now be described with reference to the accompanying drawings in which.

DESCRIPTION OF THE PREFERRED EMBODIMENT

Figure 1:
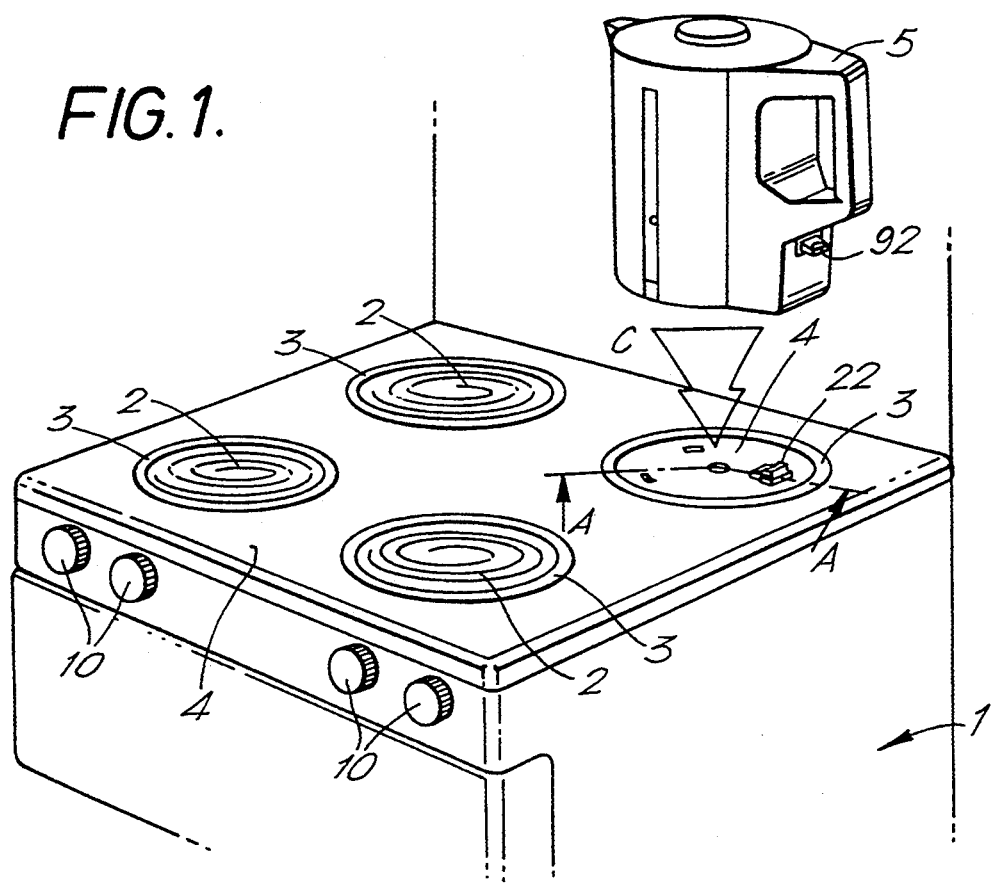
FIG. 1 shows, schematically, an adaptor of the invention installed in a domestic cooker.

FIG. 1 shows a domestic cooker 1 having three heating elements 2 arranged in respective wells 3 on the upper surface of the cooker and controlled through respective control knobs 10. An adaptor 4 of the invention is shown to be installed in a further well 3 of the cooker 1. A water heating vessel in the form of a hot water jug 5 is shown above the adaptor, and in use is moved down vertically, as shown by arrow C such that terminal pins thereof (see FIG. 3) engage in a socket connector 22 of the adaptor as will be described later.

Figure 2:
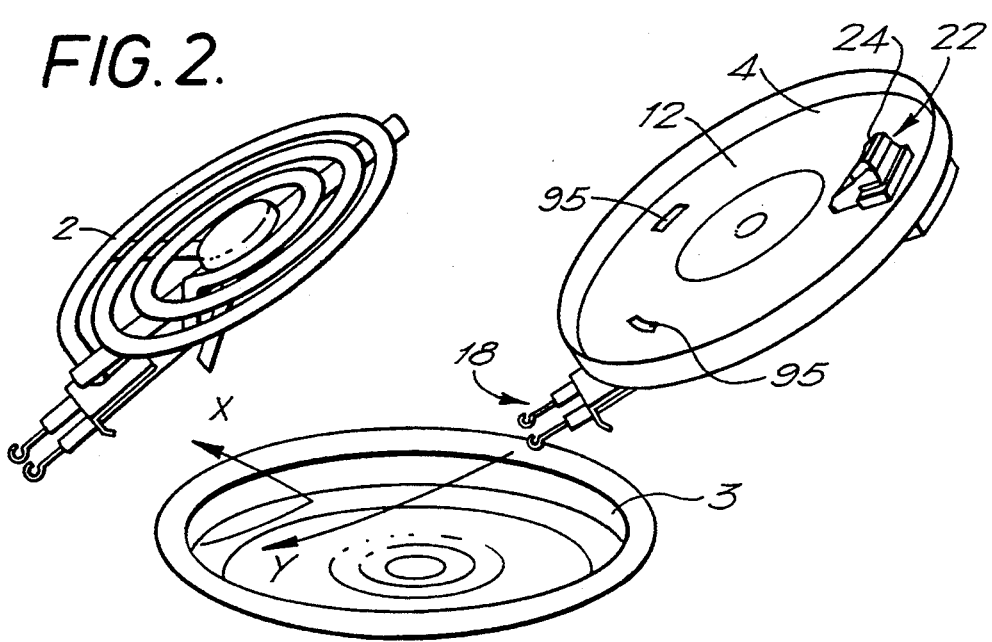
FIG. 2 shows, schematically, the installation of an adaptor of the invention in a cooker well.
Figure 3:
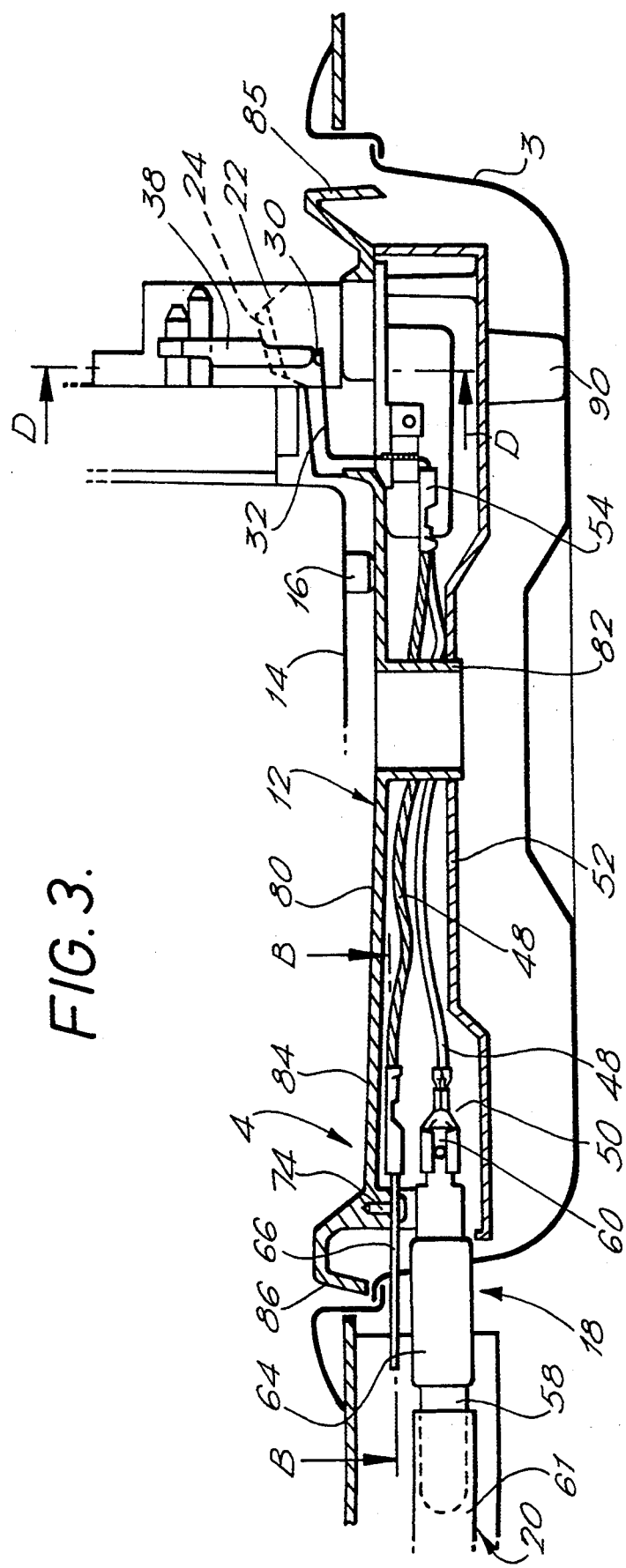
FIG. 3 is a vertical sectional view taken along the arrow A—A of FIG. 1.
Figure 4:
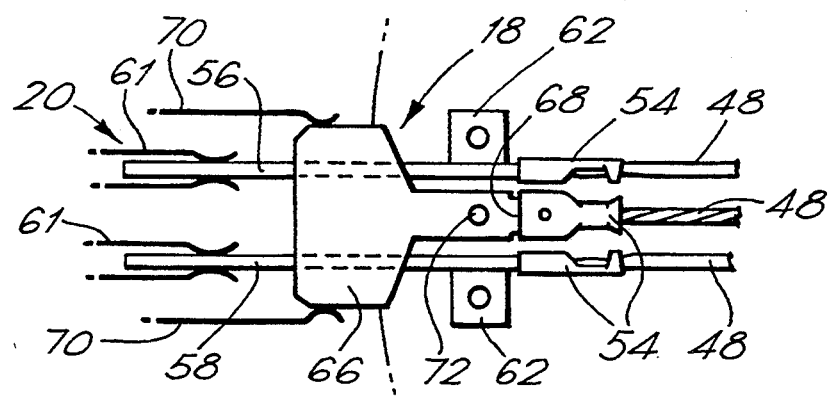
FIG. 4 is a plan view taken along line B—B in FIG. 3.
Figure 5:
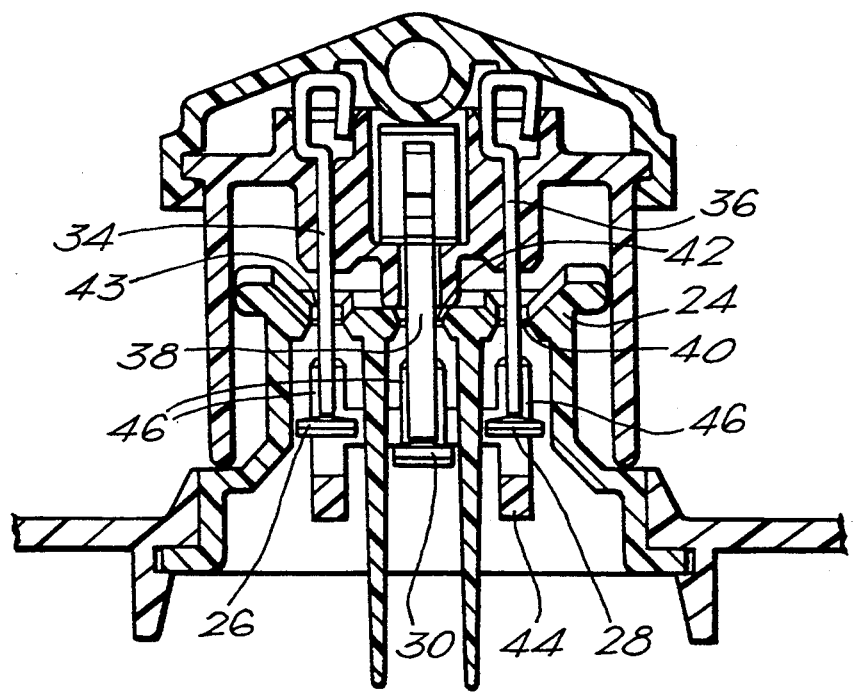
FIG. 5 is a view along line D—D of FIG. 3.

As can be seen from FIGS. 2 to 4, the adaptor 4 is provided with an upper surface 12, upon which the base 14 of the hot water jug 5 rests through feet 16, a first electrical connector 18 which, when the adaptor 4 is installed in the cooker well 3 engages in cooker socket means or receptacle 20 in the wall of the well 3, and a second electrical connector 22, which extends from the upper surface 12.

The second electrical connector is of the type generally disclosed in U.S. Pat. No. 4,934,955, and comprises an outer housing 24 upstanding from the surface 12. Live, neutral and earth contacts 26,28,30 are mounted on respective resilient leaf springs 32 within the housing 24, and are engaged by live, neutral and earth terminal pins 34,36,38 or the water jug when the jug is set down on the adaptor.

The housing 24 is provided with apertures 40,42,44 in its upper surface to allow access to the contacts. These are normally closed by a spring shutter member 44 having arms 46 which engage in the bottom part of the apertures. The shutter member is, however, moved away from the apertures by the earth pin 38 as it enters its respective aperture 42.

The second connector 22 is connected to the first connector 18 by electrical leads 48 running inside a closed compartment 50 in the adaptor. This compartment is conveniently formed by a channel section moulding 52 suitably mounted to the underside of the upper surface 12. The leads 48 are provided with, for example, spade connectors 54 at both ends, for engagement with complementary connectors provided in the first and second connectors.

The first connector 18 should be of a standard size whereby it will engage with the receptacle 20 provided in the cooker well. Most suitably it is identical to the connector provided on the removable cooker element 2. As shown schematically in FIGS. 3 and 4, in one embodiment, the first connector may comprise rectangular section live and neutral connectors 56,58 each having a spade connector portion 60 at one end, and engaging a spring connector 61 in the receptacle 20 on the cooker well at their other end. The connectors may have flanges 62 to mount them to the underside of the upper surface 12 of the adaptor 4 by screws (not shown). An insulating sleeve 64 may be provided about an exposed portion of the live and neutral connectors. An earth connector 66 may be formed as a plate-like member, tapering at one end to a spade connector portion 68, for engagement with lead 48. The widened out portion of the connector 66 engages with an earthed spring connector 70 provided in the receptacle on the cooker well. The connector 66 is provided with a through hole 72 so that it can be mounted by screw 74 to the adaptor 4.

The upper surface of the adaptor 4 is provided by a heat-resistant member 80 for example of a suitable plastic material. A central aperture 82 allows water to drain away from the upper surface 12. A portion 84 of the surface 12 slopes towards the aperture to encourage this.

The member 80 has an upwardly facing lip 85, defining a location for the vessel 5. The portion 86 of the lip 85 overlying the first connector 18 forms a cowling overlapping an edge portion of the cooker well to prevent water accidentally gaining access to the connector 18.

The adaptor 4 is supported in the cooker well 3 by feet 90 arranged at equispaced positions around its base. Furthermore, the adaptor 4 has slot-like indentations 95 in its upper surface to assist in locating the jug on the adaptor 4.

Operation of the invention will now be described. To install the adaptor of the invention, a removable cooker element 2 is removed from its cooker well 3, as shown schematically in FIG. 2 by the arrow X. The adaptor 4 is then simply slotted into the cooker well as shown by arrow Y, so that its connector 18 engages with the socket connector or receptacle 20 in the wall of the cooker well. When in position, the adaptor will be supported in the well 3 by its feet 90.

To boil water in a hot water jug 5, the jug is dropped vertically onto the adaptor, such that its terminal pins engage in the socket connector 22 of the adaptor 4. The control knob 10 of that particular element is then turned to a 'full' setting to ensure an uninterrupted electrical supply to the adaptor, and an on-off switch 92 of the jug 5 switched on. Advantageously, the jug 5 is of the type which has a steam-sensitive control which, once water in the jug boils automatically switches the switch 92 to an 'off' position, so turning the jug off. Thus once water in the jug 5 has boiled, the jug 5 may be simply lifted from the adaptor 4 to pour the water, whereupon it may be re-filled and replaced on the adaptor when it is desired to boil more water.

The adaptor 4 may be left in the cooker well 3 for as long as desired. If, however, that well is required again for a cooking element 2, the adaptor 4 may be simply removed and replaced by the element 2.

Whilst a preferred embodiment of the invention has been described above, it will be appreciated that various changes and modifications in form and detail thereof may be made without departing from the spirit and scope of the claimed invention.

I claim:

1. An adaptor for adapting a domestic cooking apparatus to supply power to a portable liquid heating vessel having its own electric heater, said adaptor comprising:
   means for supporting said vessel;
   first electrical connection means for releasable engagement with a socket connector of said domestic cooking apparatus which, in normal use of the apparatus, connects with a removable heating element of the apparatus; and
   second electrical connection means, electrically connected to said first electrical connection means, for engagement with electrical supply terminals of said liquid heating vessel when said vessel is placed on said adaptor.

2. An adaptor as claimed in claim 1 wherein said first electrical connection means comprises a pair of connector members extending generally horizontally from said adaptor for engagement with a socket connector of said cooking apparatus arranged in a side wall of a well provided in an upper surface of said cooking apparatus.

3. An adaptor as claimed in claim 1 wherein said second electrical connection means comprises a socket connector extending upwardly from a support surface of said adaptor, for engagement with terminal pins of said vessel.

4. An adaptor as claimed in claim 1 wherein said adaptor is generally circular in plan.

5. An adaptor as claimed in claim 1 wherein said adaptor comprises feet for supporting it within a well provided in an upper surface of said cooking apparatus.

6. An adaptor as claimed in claim 1 wherein an upper surface of said adaptor has means for assisting in the location of the vessel thereon.

7. An adaptor as claimed in claim 1 comprising means for allowing water to drain away from an upper surface thereof.

8. An adaptor as claimed in claim 1 comprising cowling means arranged over said first connector means.

9. An adaptor for adapting a domestic cooking apparatus to supply power to a portable liquid heating vessel having its own electric heater, said adaptor comprising:
   an upper surface for supporting said vessel,
   first electrical connection means extending generally horizontally from the adaptor for releasable engagement with a socket connector arranged in a side wall of a well provided in an upper surface of said cooking apparatus and which socket in normal use of the cooking apparatus connects with a removable heating element of said cooking apparatus; and
   second electrical socket connection means extending upwardly from said upper surface for receiving electrical supply terminal pins of said vessel to supply electrical power to said vessel when the vessel is arranged on the adaptor.

10. An adaptor as claimed in claim 9 adapted and configured so as to fill substantially the cooker well into which it is placed.

11. In combination, a domestic cooking apparatus and an adaptor for adapting said domestic cooking apparatus to supply power to a portable liquid heating vessel having its own electric heater, said adaptor comprising:
   an upper surface for supporting said vessel thereon;
   first electrical connection means extending generally horizontally from the adaptor and releasably engaged with a socket connector arranged in a side wall of a well provided in an upper surface of said cooking apparatus and which socket in normal use of the cooking apparatus connects with a removable heating element of said cooking apparatus; and second electrical socket connection means extending upwardly from said upper surface for receiving electrical supply terminal pins of said vessel to supply electrical power to said vessel when the vessel is arranged on the adaptor.

12. A combination as claimed in claim 11 wherein said adaptor substantially fills said well.

13. A method of converting a domestic electric cooker having one or more removable heating elements engageable with electrical connector means of said cooker for use with an electrically powered liquid heating vessel having its own electric heater which comprises the steps of:

removing one of the heating elements of the cooker from said electrical connector means; and engaging with said electrical connector means of the cooker previously connected to said removed element an adaptor means, said adaptor means providing an electrical connection between the cooker connector means and a further connector means of the adaptor means, the further connector means being detachably engageable with electrical supply terminals of the heater of the vessel.

14. An electrical cooking apparatus comprising a plurality of heating elements, wherein the improvement comprises a socket connector means which co-operates with a terminal pin connector provided on a liquid heating vessel for the supply of electrical power to a heating element incorporated in such vessel.

15. In combination, a portable liquid heating vessel having its own electric heater and having terminal pins for the supply of electrical energy thereto, and an adaptor for supporting said vessel in a well provided in an upper surface of a domestic cooking appliance, said adaptor having a support surface for said vessel, first electrical connection means arranged on said support surface for engagement with the said terminal pins of said heater, and second electrical connection means connected to said first connection means and arranged so as to be engageable in use with a connector arranged in said well of said cooking appliance.

* * * * *